US006074215A

United States Patent [19]

Tsurumi

[11] Patent Number: 6,074,215

[45] Date of Patent: Jun. 13, 2000

[54] ONLINE KARAOKE SYSTEM WITH DATA DISTRIBUTION BY BROADCASTING

[75] Inventor: Kanehisa Tsurumi, Hamamatsu, Japan

[73] Assignee: Yamaha Corporation, Hamamatsu, Japan

[21] Appl. No.: 09/118,164

[22] Filed: Jul. 16, 1998

[30] Foreign Application Priority Data

Jul. 18, 1997 [JP] Japan .................................... 9-194269

[51] Int. Cl.7 .............................. G09B 15/06; G10H 7/00

[52] U.S. Cl. .................................. 434/307 A; 434/307 R; 84/477 R; 84/609; 455/4.2

[58] Field of Search ................................ 434/307 R–309, 434/318, 365; 84/477 R, 601, 603, 609, 610, 625, 630, 631, 634, 645; 455/4.1, 4.2, 5.1, 6.3; 348/7, 9, 12, 13, 478; 709/219; 340/825.08; 370/449, 432, 476; 463/25, 40; 206/307, 457; 381/61; 375/240, 259; 341/60

[56] References Cited

U.S. PATENT DOCUMENTS

| | | | |
|---|---|---|---|
| 5,499,922 | 3/1996 | Umeda et al. | 434/307 A |
| 5,588,842 | 12/1996 | Nishimura et al. | 434/307 A |
| 5,613,192 | 3/1997 | Ikami et al. | 455/4.2 |
| 5,616,876 | 4/1997 | Cluts | 84/609 |
| 5,619,425 | 4/1997 | Funahashi et al. | 709/219 |
| 5,663,515 | 9/1997 | Kato | 84/609 |
| 5,691,494 | 11/1997 | Sai et al. | 84/609 |
| 5,725,383 | 3/1998 | Funahashi et al. | 434/307 A |
| 5,735,744 | 4/1998 | Okamoto | 463/40 |
| 5,770,811 | 6/1998 | Haino | 84/464 R |
| 5,797,752 | 8/1998 | Umezawa | 434/307 A |
| 5,808,223 | 9/1998 | Kurakake et al. | 84/609 |
| 5,808,224 | 9/1998 | Kato | 84/609 |
| 5,810,603 | 9/1998 | Kato et al. | 434/307 A |
| 5,824,934 | 10/1998 | Tsurumi et al. | 84/609 |
| 5,857,856 | 1/1999 | Azuma | 434/307 A |
| 5,886,275 | 3/1999 | Kato et al. | 84/609 |
| 5,899,699 | 3/1999 | Kamiya | 434/307 A |
| 5,931,679 | 8/1999 | Funahashi | 434/307 A |
| 5,982,816 | 11/1999 | Ogita et al. | 375/240 |

*Primary Examiner*—Joe H. Cheng
*Attorney, Agent, or Firm*—Pillsbury Madison & Sutro LLP

[57] ABSTRACT

A karaoke online system distributes karaoke data blocks having identification codes from a center station to a plurality of karaoke terminals through a broadcast network. In the center station, a transmitter broadcasts the karaoke data blocks with the identification codes to the broadcast network. In the karaoke terminal, a receiver receives the karaoke data blocks with the identification codes from the center station through the broadcast network. A buffer memory temporarily memorizes each of the karaoke data blocks received by the receiver. A storage device stores the karaoke data blocks after each of the karaoke data blocks is temporarily memorized in the buffer memory. A controller discriminates the karaoke data blocks while each of the karaoke data blocks stays in the buffer memory according to the identification codes attached to the karaoke data blocks for judging as to whether each of the karaoke data blocks should be transferred from the buffer memory to the storage device. The controller further operates when judging that the karaoke data block should be transferred for driving the storage device to store the karaoke data block.

15 Claims, 9 Drawing Sheets

ONLINE KARAOKE SYSTEM WITH DATA DISTRIBUTION BY BROADCASTING

BACKGROUND OF THE INVENTION

1. Field of the Invention

The present invention generally relates to an online karaoke system for distributing karaoke data having an identification code from a center station or a broadcasting center supplied with karaoke data from the center station to a plurality of karaoke terminals or sub host stations through a broadcasting communication network.

2. Description of Related Art

Online karaoke systems are known in which a center station holding a karaoke database supplies karaoke data through a public network or the like to karaoke terminals installed in a karaoke bar or the like or to a sub host station upon request from the karaoke terminals or sub host station. With the karaoke systems of this type, line usage fee is charged every time karaoke data is transmitted from the center station to each karaoke bar. Therefore, as the number of karaoke bars increases, so does the number of times at which karaoke data is transmitted, thereby presenting a problem of increased communication cost.

On the other hand, a broadcast online system is known in which data is broadcast from a key station to sub stations through a communication satellite. This system has an advantage in its suitability for efficiently distributing the same type of data to many sub stations. With the recent rapid drop in communication cost, the broadcast data communication system has been extensively put into operation in various fields.

The above-mentioned broadcast data communication technology may be applied to efficient and low-cost distribution of karaoke data in an online karaoke system connected to many karaoke terminals. However, the broadcasting of karaoke data from the center station involves a problem that a karaoke terminal not ready for receiving karaoke data or suffering from reception error caused by unfavorable weather receives defective karaoke data and has no means for receiving retransmission of correct karaoke data.

To overcome this problem, karaoke data may be broadcast repeatedly. However, this method requires the karaoke terminals or sub host stations that receive the karaoke data to keep their hard disk drives for storing the karaoke data in an accessible state until the karaoke data can be correctly received. Keeping the hard disk drives running this way is a waste of electric power and quickens their deterioration.

The transmission power of the satellite broadcasting for use in the broadcast communication is extremely high. Therefore, while the karaoke terminals or sub host stations can receive karaoke data, the capability of storing the received karaoke data into a buffer may not be so high for the data transmission. In addition, insufficient buffer capacity or insufficient transfer rate of data to the hard disk drive may make the buffer be filled up with the received karaoke data before the data transfer from the buffer to the hard disk drive is completed. On the other hand, lowering the performance of the karaoke data transmission compels the karaoke terminals or sub host stations that have enough buffer capacity to work unnecessarily for a protracted period, which is a waste of electric power and quickens hard disk drive deterioration.

SUMMARY OF THE INVENTION

It is therefore an object of the present invention to provide an online karaoke system that realizes reduced power consumption and protracted component life of connected karaoke terminals and sub host stations.

In order to achieve the object, the inventive online karaoke system comprises a transmitting apparatus and a plurality of receiving apparatuses for distributing karaoke data blocks having identification codes from the transmitting apparatus to the plurality of the receiving apparatuses through a broadcast network. In the inventive online karaoke system, the transmitting apparatus comprises broadcasting means for broadcasting the karaoke data blocks with the identification codes to the broadcast network. The receiving apparatus comprises receiving means for receiving the karaoke data blocks broadcast by the transmitting apparatus through the broadcast network, temporary memory means for temporarily memorizing the karaoke data blocks received by the receiving means, storage means for storing the karaoke data blocks after being temporarily memorized in the temporary memory means, discriminating means for discriminating the karaoke data blocks while staying in the temporary memory means according to the identification codes attached to the karaoke data blocks, judging means operative based on results of discriminating the karaoke data blocks for judging as to whether each of the karaoke data blocks should be transferred from the temporary memory means to the storage means, and drive means operative when the judging means judges that the karaoke data block should be transferred for driving the storage means to store the karaoke data block.

In the above-mentioned online karaoke system, the karaoke data block is transmitted from the transmitting apparatus, i.e., the sending side such as a center station or a broadcasting center to the receiving apparatus, i.e., the receiving side such as a karaoke terminal or a sub host station through the broadcast network. The karaoke terminal or the sub host station temporarily stores the karaoke data block into the temporary memory means while receiving the karaoke data block from the sending side. In addition, the receiving side determines whether to reserve and accumulate the karaoke data block stored in the temporary memory means into the permanent storage means. If the karaoke data block is to be accumulated, the storage means is activated to start storage of the karaoke data block. Thus, the storage means is driven only when the accumulation is required. This novel arrangement lowers the energy consumption of the connected karaoke terminals and sub host stations, and extends the service life of components such as the storage means, typically a hard disk drive, while securely preventing a dropout error of karaoke data accumulation.

Preferably, in the inventive online karaoke system, the receiving apparatus is changeable between a drive mode with more energy consumption where the storage means is able to store the karaoke data blocks and a sleep mode with less energy consumption where the storage means is unable to store the karaoke data blocks. The receiving apparatus can change from the sleep mode to the drive mode when the judging means judges that the karaoke data block should be transferred from the temporary memory means to the storage means. Preferably, the broadcasting means of the transmitting apparatus broadcasts the same karaoke data blocks at different rates. The receiving means of the receiving apparatus can receive the karaoke data blocks selectively at one of the different rates. Preferably, the broadcasting means of the transmitting apparatus repeatedly broadcasts the same karaoke data blocks at cycles.

In another aspect, the inventive online karaoke system comprises a transmitting apparatus and a plurality of receiving apparatuses for distributing karaoke data from the transmitting apparatus to the plurality of the receiving apparatuses through a broadcast network. In the inventive online karaoke system, the transmitting apparatus comprises broadcasting means for broadcasting the same karaoke data to the broadcast network at different data transfer rates. The receiving apparatus comprises selecting means for selecting one of the different data transfer rates, receiving means for receiving the karaoke data at the selected data transfer rate from the transmitting apparatus through the broadcast network, temporary memory means for temporarily memorizing the karaoke data received by the receiving means, and storage means for storing the karaoke data after being temporarily memorized in the temporary memory means.

In the above-mentioned online karaoke system, the center station or the broadcasting center transmits the same karaoke data with different transmission rates through the broadcasting communication network. Each karaoke terminal or sub host station selects one of the above-mentioned transmission rates, temporarily records the received karaoke data into the temporary memory means while receiving the karaoke data, and accumulates the same into the permanent storage means as required. Each karaoke terminal or sub host station selects the transmission rate best suited to its storage capacity and processing power. Consequently, karaoke terminals and sub host stations having only low storage capacities or processing powers can securely prevent a dropout error in the karaoke data accumulation. On the other hand, karaoke terminals and sub host stations having high storage capacities or processing powers can complete the reception of karaoke data in a short time, thereby lowering power consumption and prolonging service lives of components such as the hard disk drive.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

1. First preferred embodiment 1-1 Constitution (1) Overall constitution

Figure 1:
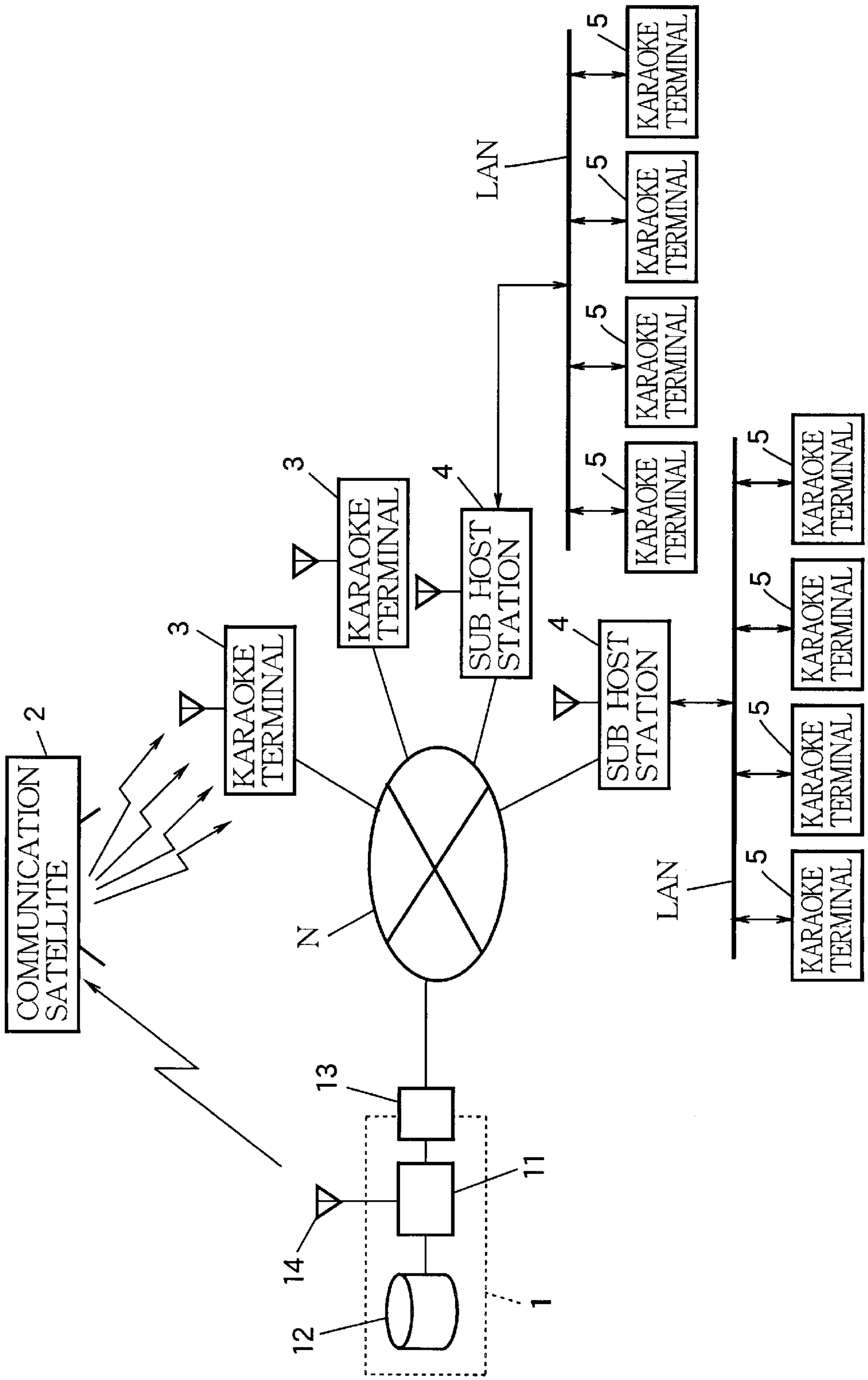
FIG. 1 is a block diagram illustrating constitution of an online karaoke system practiced as a first preferred embodiment of the invention.

Now, referring to FIG. 1, there is shown a block diagram illustrating overall constitution of an online karaoke system practiced as a first preferred embodiment. In the figure, reference numeral 1 denotes a center station of this online karaoke system, or a host station. The center station 1 has a database that holds song data providing the basis for karaoke performance, video data providing the basis for background video to be displayed during the karaoke performance, and sound effect data providing basis for sound effects such as background vocal. These three types of data are generically referred to as karaoke data.

The center station 1 is composed of a host computer 11 containing a CPU for controlling other components of the center station and a hard disk drive 12 for storing the database of karaoke data. The center station 1 has a communication interface 13 for a two-way communication network N consisting of a public telephone line or an ISDN (Integrated Services Digital Network), and a transmitter 14 for broadcasting a wireless signal through a communication satellite 2. Based on this arrangement, the center station 1 works as a transmitting apparatus and can distribute karaoke data to a plurality of receiving apparatuses including karaoke terminals 3 and sub host stations 4 through either the public line N or the broadcasting communication network.

Karaoke data to be distributed is divided into a plurality of packets or blocks. An accumulation sequence number or an identification code of 1 to n (n being an integer of 2 or higher) is attached to each packet or block at its footer. This accumulation sequence number denotes the sequence or order by which the karaoke data blocks must be consecutively received by each karaoke terminal 3 and each sub host station 4. This identification code is used to prevent the packets from being accumulated in a hard disk drive of each karaoke terminal 3 or each sub host station 4 in an irregular order. In this embodiment, the packet must be accumulated in the ascending order without skip or jump. In order to control this packet accumulation sequence, the center station 1 broadcasts through the communication satellite 2 the total number data n corresponding to the last one of the accumulation sequence numbers of the karaoke data blocks to be distributed in the sequence to each karaoke terminal 3 or each sub host station 4 before distributing the karaoke data blocks.

Each karaoke terminal 3 is connected to the center station 1 for receiving the distributed karaoke data from the center station 1 through the public line N. Each karaoke terminal 3 has a receiver for receiving a wireless signal including karaoke data broadcast from the center station 1 through the communication satellite 2.

Each sub host station 4 is provided in each karaoke parlor having two or more karaoke compartments. The sub host station 4 is connected to the center station 1 through the public network N. The sub host station 4 has a receiver for receiving a wireless signal including karaoke data broadcast from the center station 1 through the communication satellite 2. Each sub host station 4 accumulates the karaoke data distributed from the host computer 11 of the center station 1 into a karaoke database of the sub host station.

A LAN (Local Area Network) based on optical fiber cable is laid in each karaoke parlor. Through this LAN, plural karaoke terminals 5 are connected to the sub host station 4. Each karaoke terminal 5 is installed in each compartment of the karaoke parlor. In this constitution, the sub host station 4 in each karaoke parlor distributes karaoke data upon request from any of the connected karaoke terminals 5. The requesting karaoke terminal 5 receives the karaoke data to make karaoke performance and displays background video.

(2) Constitution of karaoke terminal 3

Figure 2:
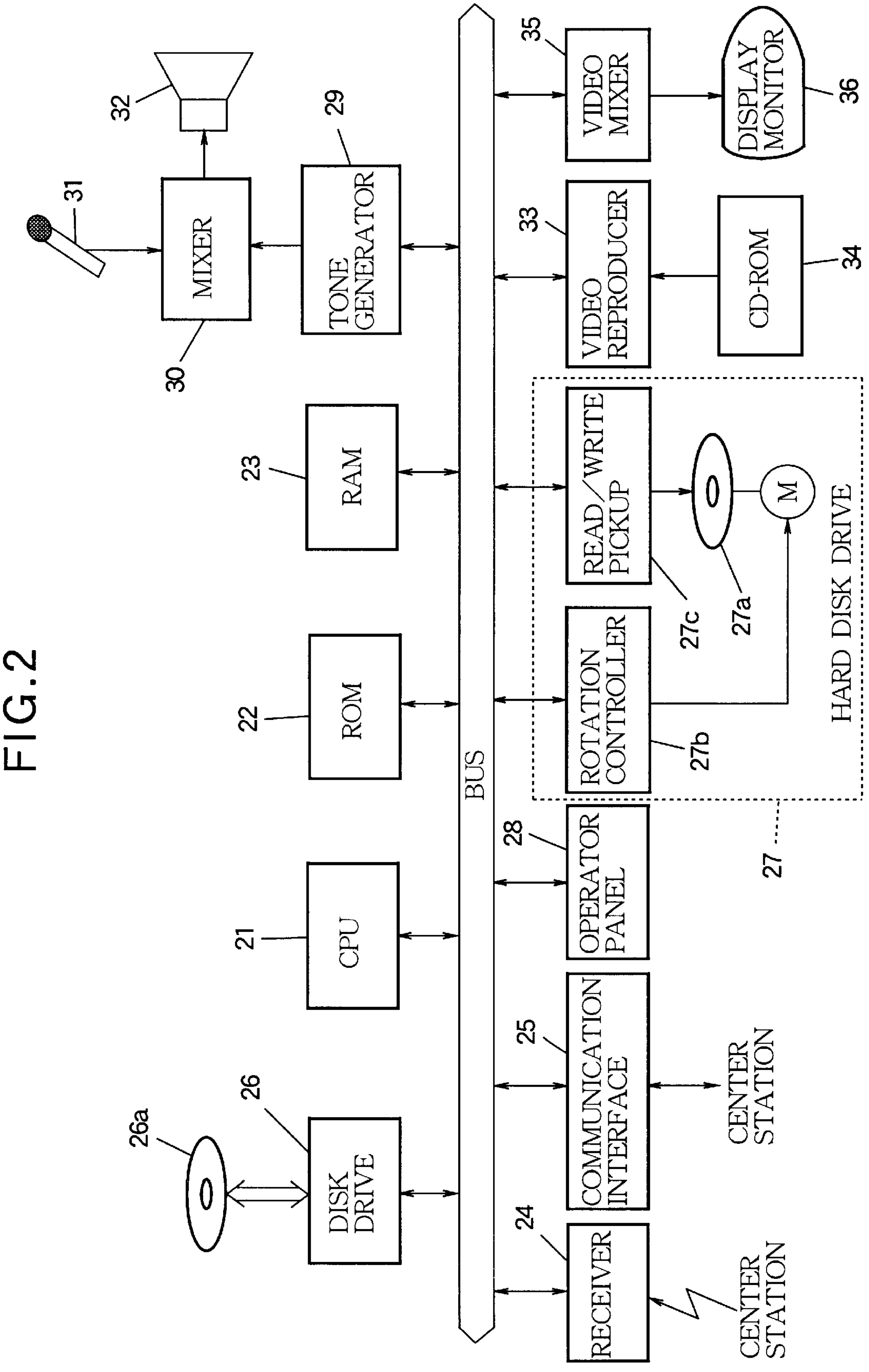
FIG. 2 is a block diagram illustrating constitution of a karaoke terminal for use in the first preferred embodiment.

Now, referring to FIG. 2, constitution of the karaoke terminal 3 will be described. In the figure, reference numeral 21 denotes a controller or CPU that controls other components of the karaoke terminal 3 interconnected through a bus. Reference numeral 22 denotes a ROM for storing a control program to be executed by the CPU 21 and font information corresponding to lyrics information included in the video data contained in the karaoke data. A RAM 23 serves not only as a work area for the CPU 21 but also as a buffer memory or temporary memory for temporarily memorizing the karaoke data distributed from the center station 1. A RAM 23 stores the total number data for controlling the reception of the karaoke data blocks supplied in a stream from the center station 1.

Reference numeral 24 denotes a receiver for receiving a wireless signal carrying the karaoke data broadcast from the center station 1 through the communication satellite 2. Reference numeral 25 denotes a communication interface for the public network N. The karaoke terminal 3 identifies an accumulation sequence number attached to each of the karaoke data blocks while receiving the same through the receiver 24 or the communication interface 25. If the identified accumulation sequence number has not been recognized before, the karaoke terminal 3 increments an accumulation sequence number count value stored in the RAM 23 at a predetermined area and, at the same time, checks as to if there is a left karaoke data block based on this count value and the distributed total number data.

Reference numeral 27 denotes a hard disk drive. The hard disk drive 27 is a storage device composed of a hard disk 27*a,* a stepper motor M for rotating the hard disk 27*a,* a rotation controller 27*b* for controlling the motor M, and a read/write pickup 27*c* for reading/writing data on the hard disk 27*a* being driven by the motor M. The hard disk 27*a* stores the karaoke data supplied from the host computer 11 of the center station 1. The karaoke data supplied from the center station 1 is temporarily memorized in the RAM 23 once, and then accumulated on the hard disk 27*a* in the order of the accumulation sequence numbers to update the karaoke database in the karaoke terminal concerned.

The karaoke terminal 3 operates either in a drive mode where the karaoke data stored in the RAM 23 is accumulated on the hard disk 27*a* or the karaoke data is read from the hard disk 27*a,* or in a sleep mode where the karaoke data stored in the RAM 23 is not accumulated on the hard disk 27*a*. In the drive mode, the rotation controller 27*b* rotates the motor M and makes the read/write pickup 27*c* write the data on the hard disk 27*a* or read the data from the same. On the other hand, in the sleep mode, the rotation controller 27*b* does not rotate the stepper motor M and the read/write pickup 27*c* does not operate. Therefore, the karaoke terminal 3 consumes less power in the sleep mode.

An operator panel 28 sends a signal generated by an operation made on the operator panel 28 to the CPU 21. Through the operator panel 28, the operator makes such operations generally required for karaoke performance as song selection, performance start and stop, and volume and tempo setting.

A tone generator 29 generates a music tone signal according to the performance information included in the karaoke data sequentially supplied by the CPU 21, and sends the generated music tone signal to a mixer 30. The mixer 30 mixes this music tone signal with a singing voice signal captured from a microphone 31 to sound a resultant mixed signal from a loudspeaker 32.

A video reproducer 33 reads compressed image information corresponding to the karaoke song to be performed from a CD-ROM 34, decompresses the image information, and transfers the decompressed image information to a video mixer 35. The video mixer 35 generates font information according to lyrics information supplied by the CPU 21, and makes a display monitor 36 show the generated font information together with the image information representing the background picture.

(3) Constitution of sub host station 4 and karaoke terminal 5

Figure 3:
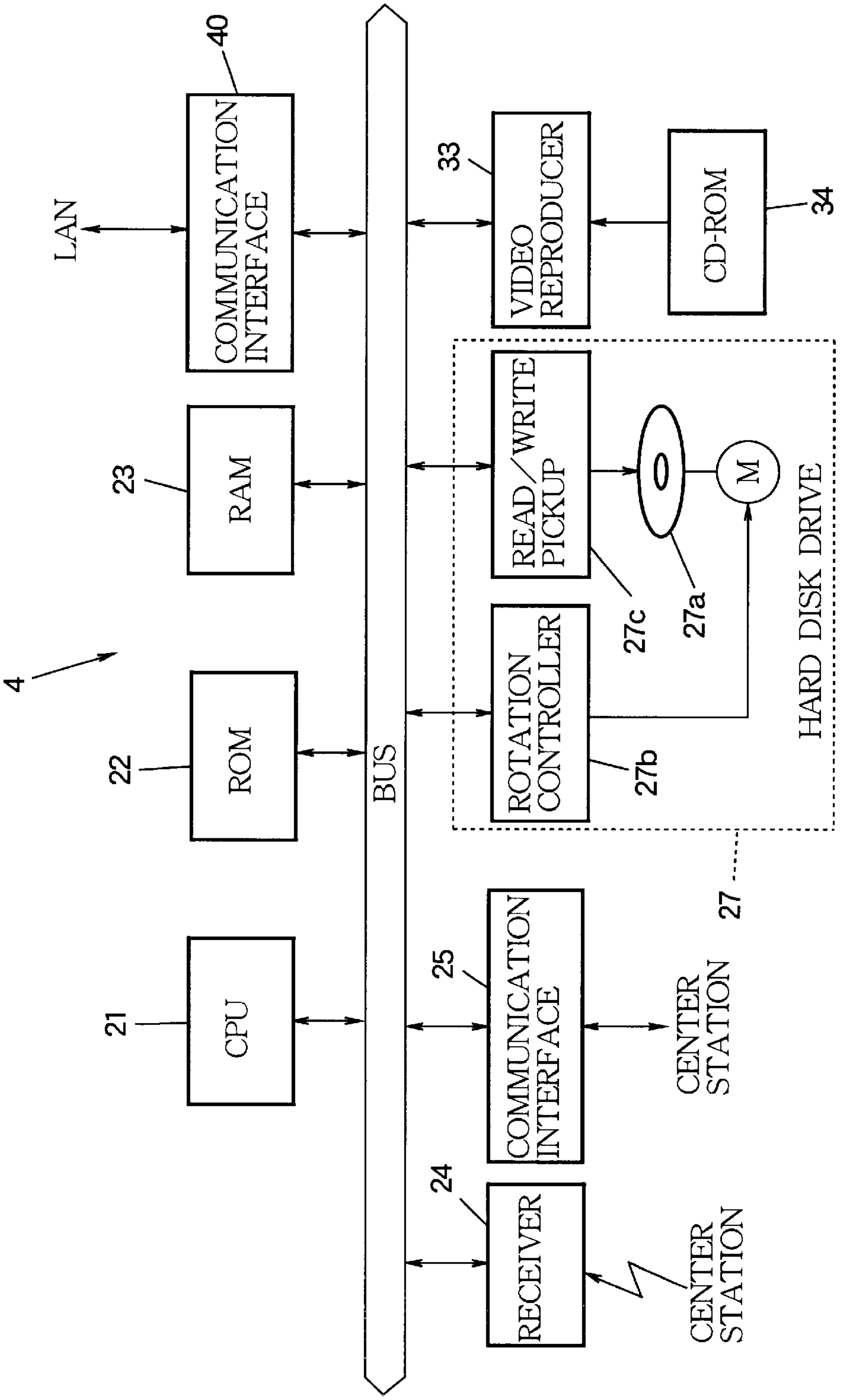
FIG. 3(A) is a block diagram illustrating constitution of a sub host station for use in the first preferred embodiment.
FIG. 3(B) is a block diagram illustrating constitution of another karaoke terminal for use in the first preferred embodiment.
Figure 3:
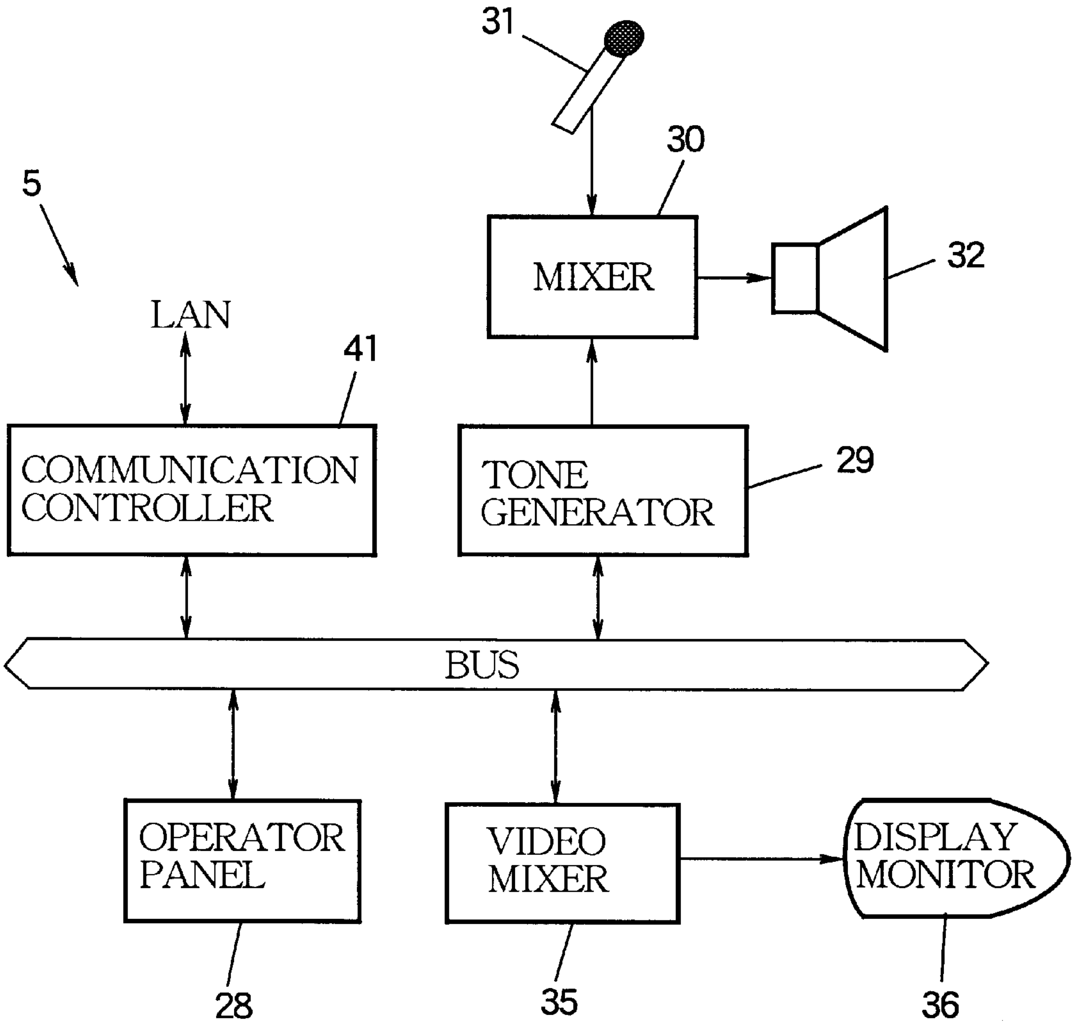

FIGS. 3(A) and 3(B) illustrate a constitution of the sub host station 4 and a constitution of a karaoke terminal 5, respectively. With reference to FIGS. 3(A) and 3(B), components similar to those previously described in FIG. 2 are denoted by the same reference numerals. The sub host station 4 is composed of a CPU 21, a ROM 22, a RAM 23, a receiver 24, a communication interface 25, and a hard disk drive 27. The sub host station 4 temporarily memorizes karaoke data supplied from the host computer 11 of the center station 1 through the receiver 24 or the communication interface 25 into the RAM 23 once, and then accumulates the karaoke data into a hard disk 27*a* in the order of the accumulation sequence numbers.

The RAM 23 stores the total number data for controlling reception of the karaoke data supplied from the center station 1. In this constitution, the sub host station 4 identifies the accumulation sequence number attached to each of the karaoke data blocks while receiving the same. If the identified accumulation sequence number has not been recognized before, the sub host station 4 increments an accumulation sequence number count value stored in the RAM 23 at the predetermined area and, at the same time, checks if there is a remaining karaoke data block to be further received, based on this count value and the provisionally distributed total number data.

The sub host station 4 operates in the drive mode where the karaoke data stored in the RAM 23 is accumulated on the hard disk 27*a* or the karaoke data is read from the hard disk 27*a,* or in the sleep mode where the karaoke data stored in the RAM 23 is not accumulated on the hard disk 27*a*. In the drive mode or active state, the rotation controller 27*b* rotates the motor M and makes the read/write pickup 27*c* write the data on the hard disk 27*a* or read the data from the same. On the other hand, in the sleep mode or inactive state, the rotation controller 27*b* does not rotate the stepper motor M and the read/write pickup 27*c* does not operate. Therefore, the sub host station 4 consumes less power in the sleep mode than the drive mode.

The sub host station 4 also has a video reproducer 33 and a CD-ROM 34. The video reproducer 33 reads compressed video information corresponding to the karaoke data specified by any of the karaoke terminals 5 from the CD-ROM 34, decompresses the video information, and transfers the decompressed video information to the requesting karaoke terminal 5 through the LAN. It should be noted that reference numeral 40 denotes a communication interface for the LAN. This communication interface 40 enables transfer of the karaoke data to each karaoke terminal 5 and receipt of signals from each karaoke terminal 5.

On the other hand, the karaoke terminal 5 has a communication controller 41 connected to the LAN as shown in FIG. 3(B). The communication controller 41 supplies signals generated by various input operations made by the operator on an operator panel 28 to the sub host station 4. In the karaoke terminal 5, a tone generator 29 generates a music tone signal corresponding to the performance information sequentially supplied by the CPU 21 of the sub host station 4, and supplies the generated music tone signal to a mixer 30. The mixer 30 mixes this music tone signal with a singing voice signal captured from a microphone 31, and sounds the resultant mixed signal from a loudspeaker 32. Further, in the karaoke terminal 5, a video mixer 35 generates font information according to lyrics information supplied by the CPU 21 and makes a display monitor 36 show the generated font information together with background picture.

Referring again to FIG. 1 and FIG. 2, the inventive communication system is comprised of a transmitting apparatus in the form of the center station 1 and a plurality of receiving apparatuses in the form of the karaoke terminals 3 for distributing karaoke data blocks having identification codes from the transmitting apparatus to the plurality of the receiving apparatuses through a broadcast network. In the transmitting apparatus, the transmitter 14 broadcasts the karaoke data blocks with the identification codes to the broadcast network. In the receiving apparatus, the receiver 24 receives the karaoke data blocks with the identification codes from the transmitting apparatus through the broadcast network. The buffer memory or RAM 23 temporarily memorizes each of the karaoke data blocks received by the receiver 24. The storage device or the hard disk drive 27 stores the karaoke data blocks after each of the karaoke data blocks is temporarily memorized in the buffer memory. The controller or CPU 21 discriminates the karaoke data blocks while each of the karaoke data blocks stays in the buffer memory according to the identification codes attached to the karaoke data blocks for judging as to whether each of the karaoke data blocks should be transferred from the buffer memory to the storage device. The controller further operates when judging that the karaoke data block should be transferred for driving the storage device to store the karaoke data block.

Specifically, the receiving apparatus is changeable between the active state with more energy consumption such that the storage device is able to store the karaoke data blocks, and the inactive state with less energy consumption such that the storage device is unable to store the karaoke data blocks. The receiving apparatus can restore from the inactive state to the active state when the controller judges that the karaoke data block should be transferred from the buffer memory to the storage device. The transmitter 14 broadcasts a set of the karaoke data blocks in a stream such that each of the karaoke data blocks is sequentially transmitted with the identification code that identifies an order of each karaoke data block in the stream. The receiver 24 sequentially receives the karaoke data blocks transmitted in the stream, and the controller or the CPU 21 operates according to the identification codes to keep the order of the karaoke data blocks during the course of storing the karaoke data blocks into the storage device. The transmitter 14 repeatedly broadcasts a set of the same karaoke data blocks. The controller or the CPU 21 operates when the order of the karaoke data blocks is disturbed during the course of storing the karaoke data blocks for controlling the storage device to stop the storing and then to restart the storing when a next set of the same karaoke data blocks is received. Such operation will be described in detail hereinafter.

1-2 Operation of the first embodiment

The following describes operation of the above-mentioned preferred embodiment.

(1) Distribution of karaoke data

Figure 4:
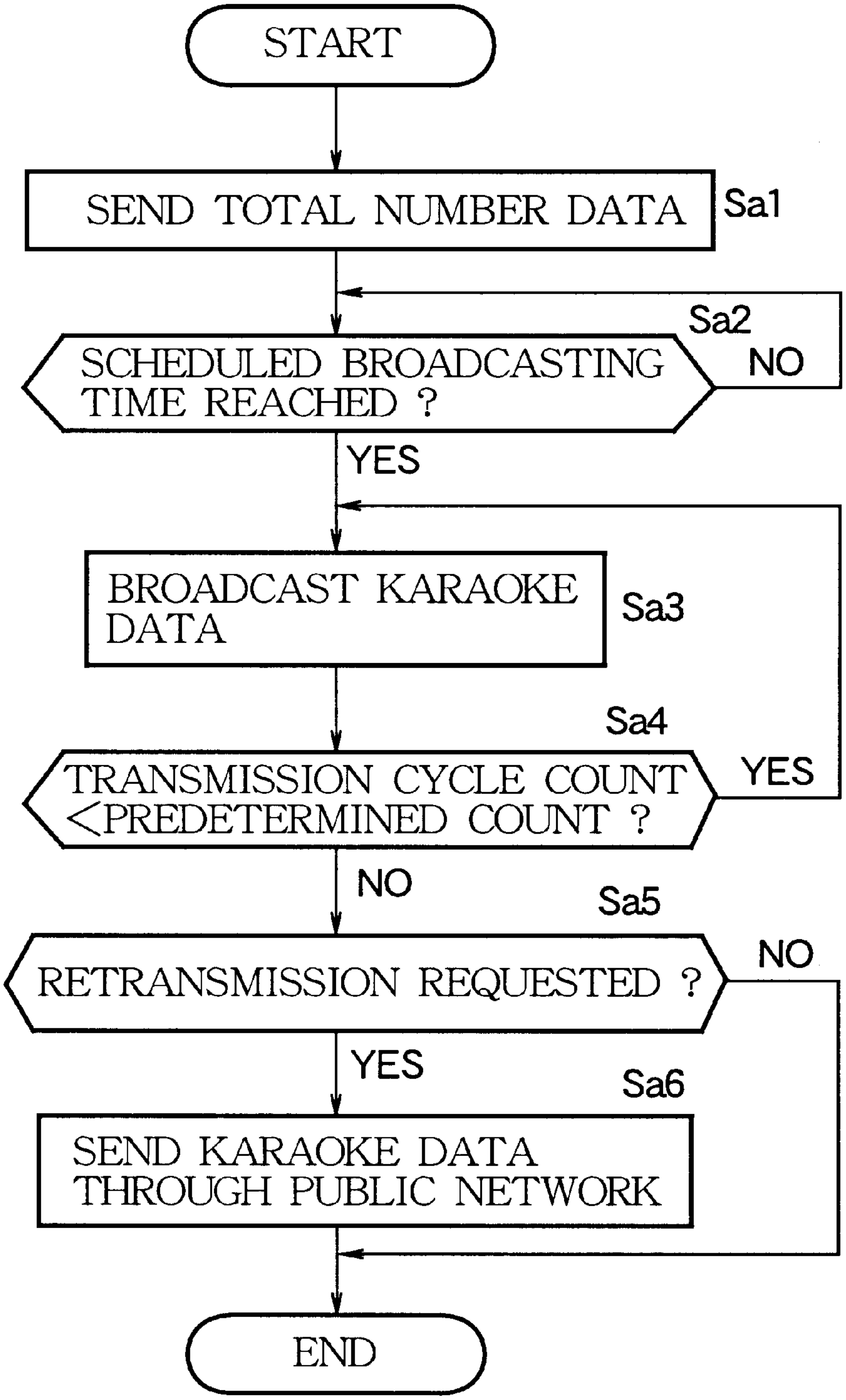
FIG. 4 is a flowchart indicative of operation associated with karaoke data distribution by a center station of the first preferred embodiment.
Figure 5:
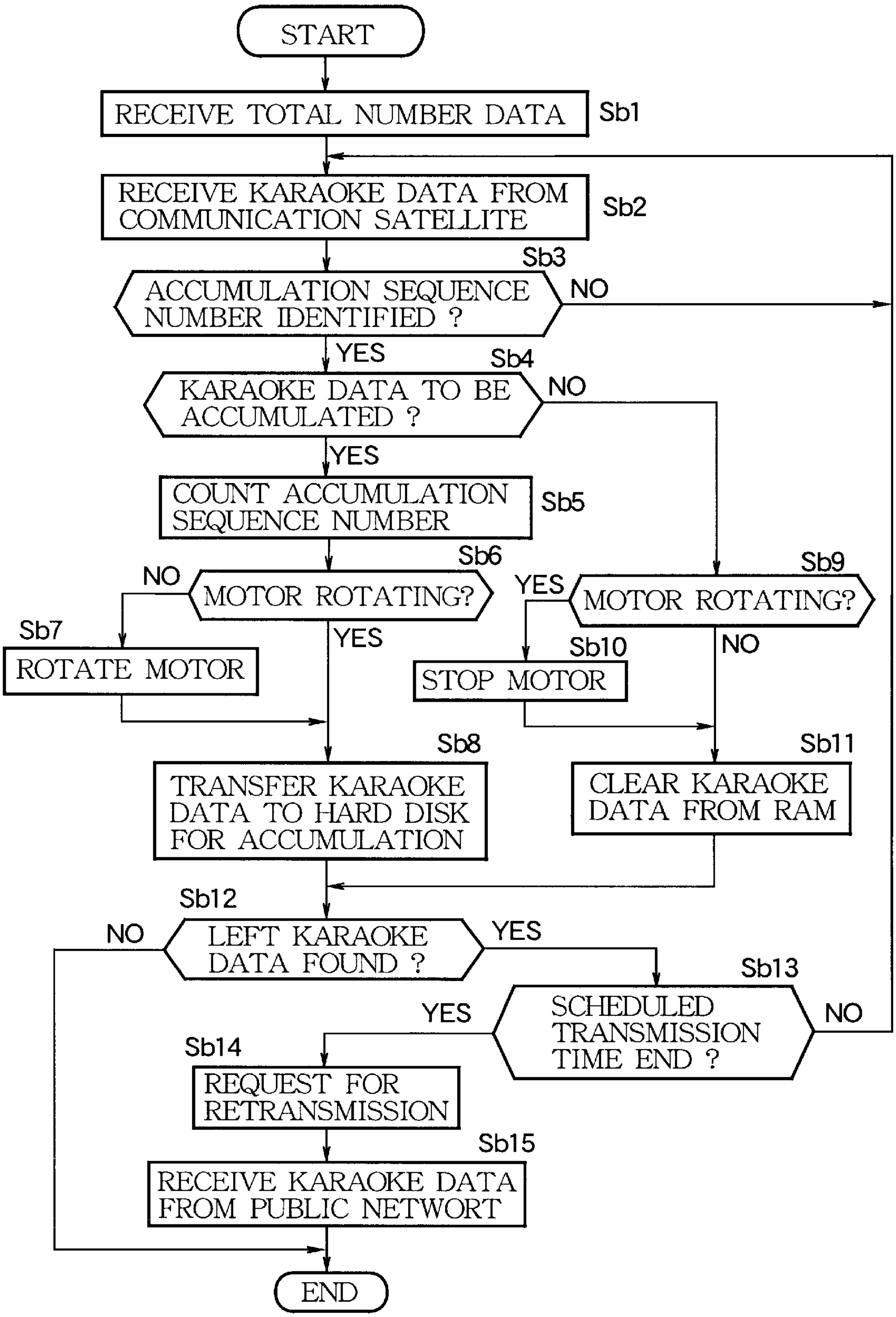
FIG. 5 is a flowchart indicative of operation associated with karaoke data distribution for the karaoke terminal or the sub host station.

FIG. 4 is a flowchart indicative of the operation of the center station 1 at the time of karaoke data distribution. FIG. 5 is a flowchart indicative of the operation of the karaoke terminal 3 or the sub host station 4. In what follows, the operations to be executed at the time of the karaoke data distribution will be described with reference to these figures.

Now, referring to FIG. 4, before sending karaoke data, the center station 1 broadcasts the total number data n corresponding to the last one of accumulation sequence numbers of karaoke data blocks to each karaoke terminal 3 and to each sub host station 4 through the communication satellite 2 (step Sa1). At the same time, the center station 1 broadcasts schedule data for informing a scheduled broadcasting end time, which is determined by a time required for one transmission session or cycle of the karaoke data and a predetermined number of sessions or cycles to be repeated, which is preset in this online karaoke system.

The karaoke terminal 3 or the sub host station 4 (refer to FIG. 5) receives the total number data and the scheduled broadcasting end time data through the receiver 24, and stores the received data into the RAM 23 at a predetermined area other than a buffer area in which the karaoke data and the accumulation sequence number count value are stored (step Sb1).

Next, the center station 1 (refer to FIG. 4) starts to broadcast a set of karaoke data blocks at the scheduled time (steps Sa2 and Sa3). The center station 1 sends the karaoke data blocks in the order of the above-mentioned accumulation sequence numbers. This broadcasting is repeated until the predetermined number of sessions or cycles preset in this online karaoke system is reached (step Sa4).

The karaoke terminal 3 or the sub host station 4 (refer to FIG. 5) receives the karaoke data block every time the same is distributed, and stores the received karaoke data block into the RAM 23 once (step Sb2). Then, the karaoke terminal 3 or the sub host station 4 identifies the accumulation sequence number attached to the footer of each packet or block of the received karaoke data. The karaoke terminal 3 or the sub host station 4 determines or judges whether the identified accumulation sequence number matches the updated count value obtained by adding 1 to the last count value of the accumulated blocks stored in the RAM 23 at the predetermined area (steps Sb3 and Sb4). This determination is made whether or not to accumulate the karaoke data of the received packet into the hard disk 27*a*.

If the determination in step Sb4 is YES, then the processing goes to step Sb5 to increment the count value of the accumulation sequence number stored in the RAM 23. Then, if the motor M of the hard disk drive 27 is not rotating, the karaoke terminal 3 or the sub host station 4 rotates the motor M (step Sb6). In other words, the karaoke terminal 3 or the sub host station 4 exits the sleep mode and enters the drive mode. Then, the karaoke terminal 3 or the sub host station 4 transfers the karaoke data of that packet stored in the RAM 23 to the hard disk 27*a* for consecutive accumulation (steps Sb7 and Sb8). This registers the new karaoke data into the karaoke database of the karaoke terminal 3 or the sub host station 4, and clears or erases the karaoke data temporarily stored in the RAM 23. According to the determination in step Sb4, the coming karaoke data block is accumulated in the RAM 23 in the order of the accumulation sequence numbers.

On the other hand, if the determination or judgement in step Sb4 is NO, the processing goes to step Sb9 to stop the rotation of the motor M of the hard disk drive 27 if the motor M is rotating (step Sb10). In other words, the karaoke terminal 3 or the sub host station 4 exits the drive mode and enters the sleep mode. Then, the karaoke terminal 3 or the sub host station 4 clears the karaoke data of that packet temporarily stored in the RAM 23 (step Sb11).

From step Sb8 or Sb11, the processing goes to step Sb12, in which the karaoke terminal 3 or the sub host station 4 determines whether the count value of the above-mentioned accumulation sequence number matches with the total number data stored in the RAM 12. This determination is made to check as to if there is a left or remaining karaoke data block due to some trouble such as unfavorable weather. If this determination proves that there is no remaining blocks, the processing ends.

On the other hand, if the determination in step Sb12 indicates that there is left blocks, the processing goes to step Sb13, in which the karaoke terminal 3 or the sub host station 4 references the timer of the CPU 21 to determine whether the scheduled transmission end time has come. If the determination is NO, the processing of the karaoke terminal 3 or the sub host station 4 returns to step Sb2, in which the operations so far are repeated. Namely, the karaoke terminal 3 waits for a next cycle of the data distribution to continue the storage of the karaoke data to further receive the remaining blocks.

If the determination in step Sb13 is YES, it indicates that there is a missing or dropped block although the repetitive broadcasting cycles by the center station 1 have completed. If this happens, the karaoke terminal 3 or the sub host station 4 sends a retransmission request signal including the information indicative of the accumulation sequence numbers corresponding to the missing karaoke data blocks and information for identifying this karaoke terminal or this sub host station to the center station 1 through the public network N (step Sb14).

Receiving this retransmission request signal (step Sa5), the center station 1 (refer to FIG. 4) identifies the karaoke data requesting the retransmission based on the received information included in this signal. Based on the identification, the center station 1 sends the missing karaoke data blocks subsequent to the last karaoke data block according to the accumulation sequence numbers corresponding to the missing karaoke data blocks, to the requesting karaoke terminal 3 or the requesting sub host station 4 through the public network N in the order of the accumulation sequence numbers (step Sa6). Then, the processing goes back to step Sa1, in which the center station 1 sends the total number data at the beginning of a next period. On the other hand, if no retransmission request comes from the karaoke terminal 3 or the sub host station 4, the center station 1 does not execute the above-mentioned retransmission processing.

The karaoke terminal 3 or the sub host station 4 (refer to FIG. 5) that has made the retransmission request receives the karaoke data from the center station 1 through the public network N every time the distribution is executed by the center station 1. The receiving side stores the received karaoke data in the RAM 23 once, and then transfers the same to the hard disk 27*a* for accumulation (step Sb15). In this reception, the determination of the accumulation sequence number made in step Sb4 is not executed. Because the data reception in the communication through the public network N fails very seldom, the received karaoke data is almost always accumulated in the RAM in the order of the accumulation sequence numbers. Then, the karaoke terminal 3 or the sub host station 4 that has made the retransmission request ends the recovery processing.

(2) Song reproduction

The following describes song reproducing operation to be executed on the karaoke terminal 3 or the sub host station 4 and the karaoke terminal 5. First, when the operator selects a song to be sung on the operator panel 28 and instructs the start of performance, the CPU 21 moves from the sleep mode to the drive mode to load the karaoke data corresponding to the selection from the hard disk 27*a* into the RAM 23. Then, the CPU 21 sequentially interprets the loaded karaoke data and supplies the resultant performance information to the tone generator 29 and, at the same time, transfers the font information corresponding to the lyrics information included in the karaoke data from the ROM 22 to the video mixer 35. On the other hand, the CPU 21 supplies the song code included in the karaoke data to the video reproducer 33. Thus, the video data corresponding to the selected song is read from the CD-ROM 34 and supplied to the video mixer 35. Then, the music tone signal generated by the tone generator 29 is mixed by the mixer 30 with a singing voice signal inputted from the microphone 31, and the resultant mixed signal is sounded from the loudspeaker 32. In the video mixer 35, the video data and the lyrics font information are synthesized to display the background video and lyrics on the display monitor 36 as the selected karaoke song progresses.

1-3 Effects of the first embodiment

According to the above-mentioned first embodiment, the inventive online karaoke system comprises a transmitting apparatus such as the center station 1 and a plurality of receiving apparatuses such as the karaoke terminals 3 for distributing karaoke data blocks having identification codes or accumulation sequence numbers from the transmitting apparatus to the plurality of the receiving apparatuses through a broadcast network. In the inventive online karaoke system, the transmitting apparatus comprises broadcasting means composed of the transmitter 14 for broadcasting the karaoke data blocks with the identification codes to the broadcast network. The receiving apparatus comprises receiving means composed of the receiver 24 for receiving the karaoke data blocks broadcast by the transmitting apparatus through the broadcast network, temporary memory means composed of the RAM 23 for temporarily memorizing the karaoke data blocks received by the receiving means, storage means composed of the hard disk 27*a* for storing the karaoke data blocks after being temporarily memorized in the temporary memory means, discriminating means realized by the CPU 21 for discriminating the karaoke data blocks while staying in the temporary memory means according to the identification codes attached to the karaoke data blocks, judging means realized also by the CPU 21 and operative based on results of discriminating the karaoke data blocks for judging as to whether each of the karaoke data blocks should be transferred from the temporary memory means to the storage means, and drive means composed of the rotation controller 27*b* operative when the judging means judges that the karaoke data block should be transferred for driving the storage means to store the karaoke data block.

Preferably, in the inventive online karaoke system, the receiving apparatus is changeable between the drive mode with more energy consumption where the storage means is able to store the karaoke data blocks and the sleep mode with less energy consumption where the storage means is unable to store the karaoke data blocks. The receiving apparatus can change from the sleep mode to the drive mode when the judging means judges that the karaoke data block should be transferred from the temporary memory means to the storage means. Preferably, the broadcasting means of the transmitting apparatus repeatedly broadcasts the same karaoke data blocks at cycles.

By such a construction, the karaoke data is distributed from the center station 1 to each karaoke terminal 3 or each sub host station 4 through the communication satellite 2 in a broadcast manner. While receiving the karaoke data, the karaoke terminal 3 or the sub host station 4 temporarily stores the received karaoke data into the RAM 23, and determines whether the karaoke data stored in the RAM 23 is to be accumulated in the hard disk 27*a*. If the karaoke terminal 3 or the sub host station 4 determines that the karaoke data is to be accumulated by referencing the accumulation sequence number, the karaoke terminal 3 or the sub host station 4 drives the hard disk drive 27.

As described, the received karaoke data is temporarily stored in the RAM 23, and determination is made based on the accumulation sequence number as to accumulate the karaoke data. Consequently, the karaoke data is accumulated on the hard disk 27*a* always in the order of the accumulation sequence numbers. The motor M of the hard disk drive 27 is driven only when required, thereby saving the power consumption of the karaoke terminal 3 or the sub host station 4 and protracting the service lives of components such as the motor M, while preventing the dropout of the accumulated karaoke data.

Because the center station 1 distributes the karaoke data to each karaoke terminal 3 or each sub host station 4 in efficient and low-cost broadcasting, the efficiency of karaoke data distribution can be enhanced more than that achieved by use of the public network N alone, and the data distribution itself is less costly. If a dropout occurs in the broadcasting of the karaoke data due to some trouble such as unfavorable weather, each karaoke terminal 3 or each sub host station 4 checks for the dropout by the total number data distributed beforehand. If the dropout is found, the center station 1 retransmits the missing karaoke data safely and surely through the public network N to the karaoke terminal 3 or the sub host station 4 that has requested the retransmission.

In addition, the karaoke data is repeatedly sent from the center station 1 to the karaoke terminal 3 or the sub host station 4 by broadcasting before retransmitting the missing karaoke data. This reduces the amount of karaoke data to be retransmitted over the public network N that is comparatively costly and less efficient. Consequently, this novel constitution realizes karaoke data distribution that is safe, reliable, efficient, and less costly.

1-4 Variations

It should be noted that the present invention is not limited to the above-mentioned first preferred embodiment. For example, the following variations are expedient.

Figure 6:
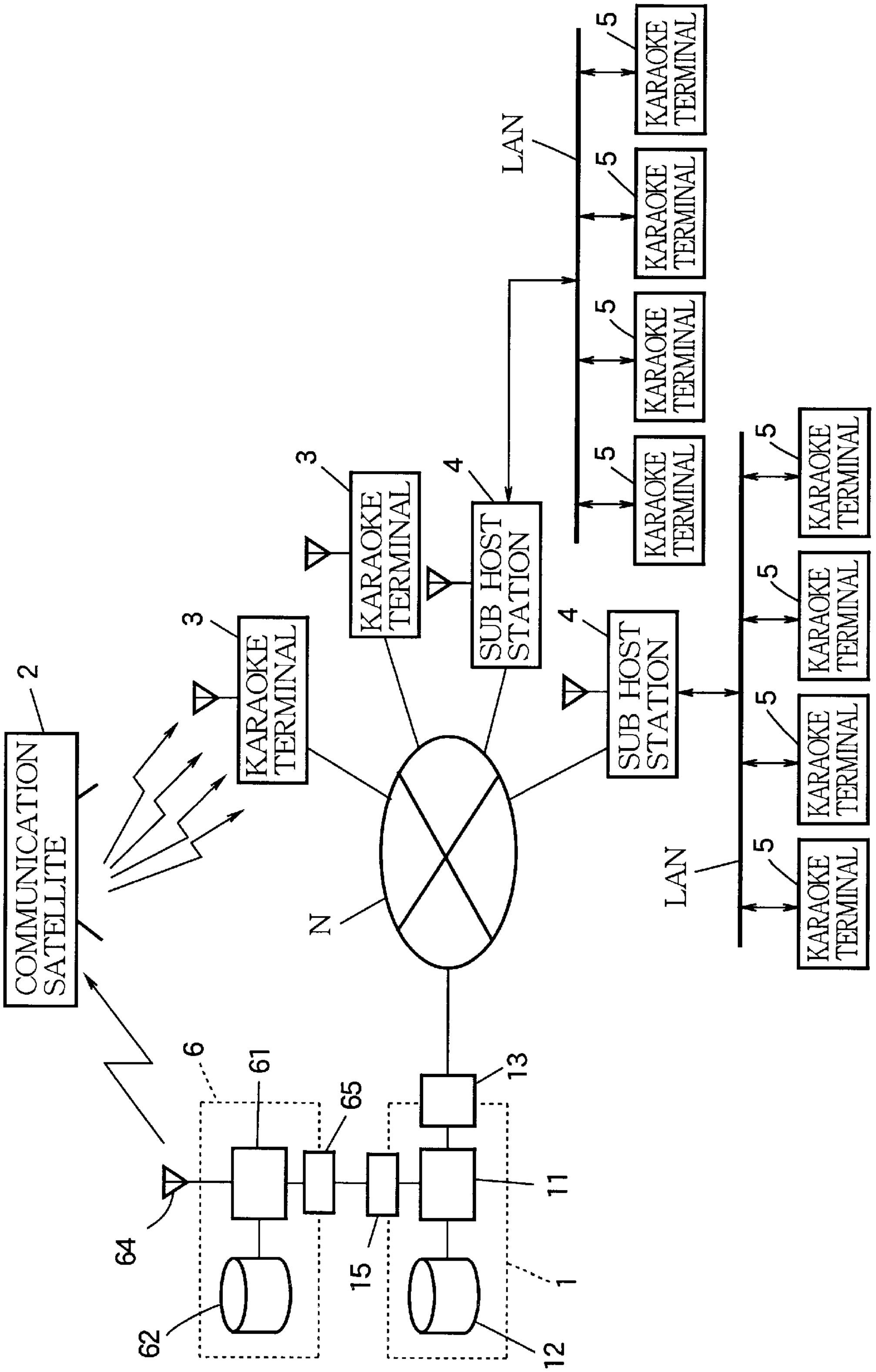
FIG. 6 is a block diagram illustrating constitution of a variation to the first preferred embodiment.

(1) In the above-mentioned first embodiment, the broadcasting of the karaoke data is executed by the center station 1. In a variation shown in FIG. 6, a broadcasting center 6 receives karaoke data from the center station 1, and then broadcasts the received karaoke data. As shown in FIG. 6, the broadcasting center 6 is composed of a host computer 61 for controlling other components of the center 6 and a hard disk 62 for storing the karaoke data supplied from the host computer 11. The broadcasting center 6 has a communication interface 65 for the center station 1. The center station 1 also has the communication interface 15 for the broadcasting center 6. Further, the broadcasting center 6 has a transmitter 64 for broadcasting wireless signals through the communication satellite 2. This constitution allows the broadcasting center 6 to distribute the karaoke data to plural karaoke terminals 3 and sub host stations 4. The sequence of karaoke data transmission follows the above-mentioned accumulation sequence number.

(2) In the above-mentioned first embodiment, if the karaoke terminal 3 or the sub host station 4 fails to receive the total number data of the karaoke data blocks, the karaoke terminal 3 or the sub host station 4 cannot check whether the karaoke data has been all received or not. In taking account of such a situation, a list of already transmitted total number data may be sent to each karaoke terminal 3 or each sub host station 4. Receipt of the total number data may be checked by the karaoke terminal 3 or the sub host station 4 based on the separately provided check list. Because the check list is smaller in size than the karaoke data, a communication trouble occurs less often on the total number data than the karaoke data.

(3) In order to circumvent the above-mentioned situation in which the total number data itself cannot be received, the total number data may be distributed only through the public network N.

(4) In the above-mentioned first embodiment, the communication satellite is used for broadcasting the karaoke data. Other broadcasting means may also be used whether wireless or not.

(5) For the control information of broadcasting, key information for enabling/disabling broadcasting services may be sent from the center station 1 to each karaoke terminal 3 or each sub host station 4 through the public network N.

(6) In the karaoke data to be broadcast, the accumulation sequence number may be attached to the header of each packet rather than the footer. In such a case, the karaoke terminal 3 can determine that the karaoke data block is unnecessary upon receiving its header, and therefore may skip writing of this karaoke data block into the RAM 23.

2. Second preferred embodiment

The following describes an online karaoke system practiced as a second preferred embodiment of the invention. The second embodiment is generally similar in constitution to the first embodiment. A difference lies in that the broadcasting center 6 which has received karaoke data from the center station 1 sends the same karaoke data with different transmission rates. Namely, a host apparatus such as the center station 1 and the broadcasting center 6 distributes karaoke data blocks to a plurality of karaoke apparatuses such as the karaoke terminals 3 through a broadcast network. The host apparatus is provided with the database in the form of the hard disk 12 that provides an update set of karaoke data blocks and arranges the karaoke data set in a stream to feed the karaoke apparatuses. Further, the transmitter 14 broadcasts the update set of the karaoke data blocks separately in a fast stream and in a slow stream so as to enable each of the karaoke apparatuses 3 to select the fast stream to receive the karaoke data blocks when the karaoke apparatus works fast, and to otherwise select the slow stream to receive the karaoke data blocks when the karaoke apparatus works slow.

Because the transmission capability of the communication satellite 2 for use in the data broadcasting is extremely high, the karaoke terminal 3 or the sub host station 4 may be not in time for temporarily store the received karaoke data into the buffer or the RAM 23. Due to insufficient buffer capacity or insufficient capability of transferring karaoke data to the hard disk 27*a*, the buffer may be filled up with the received karaoke data before the data transfer from the buffer to the hard disk 27*a* is completed. If the karaoke data transmission capability of the sending side is lowered in an attempt to solve the above-mentioned problems, another karaoke terminal having the great capacity may be affected adversely. Namely, the hard disk drive 27 of those karaoke terminals 3 or the sub host stations 4 which have large enough buffers and fast enough transfer capabilities are driven unnecessarily long, thereby increasing power consumption and accelerating deterioration of the hard disk drive 27.

Figure 7:
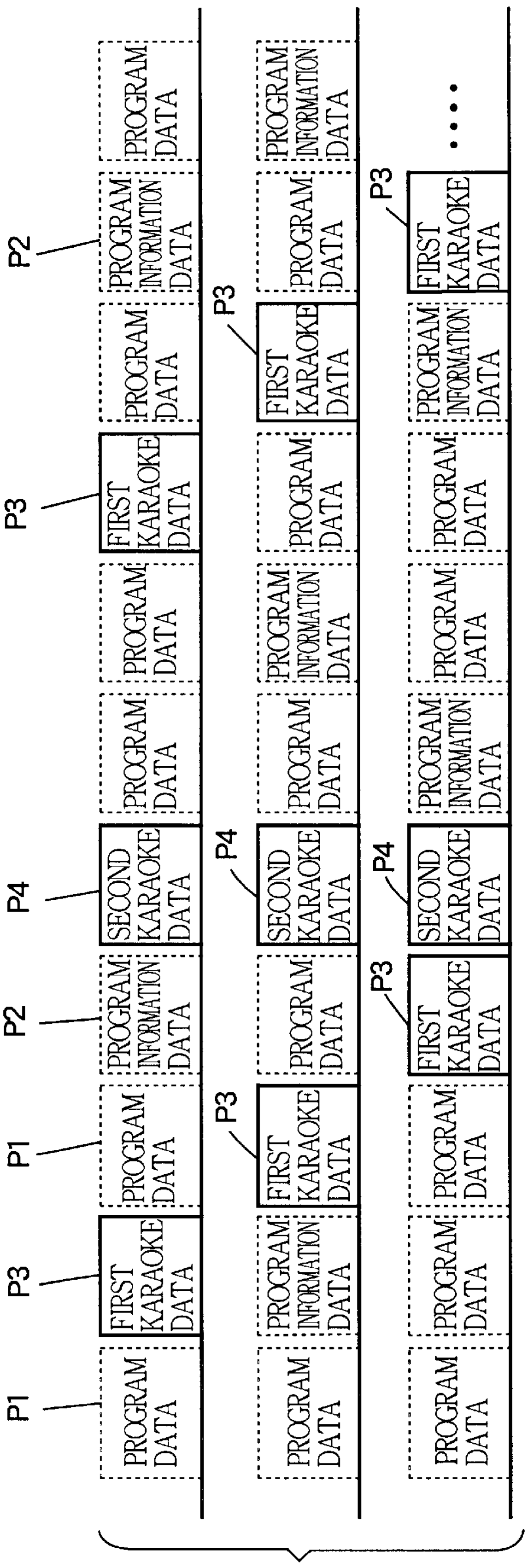
FIG. 7 is a diagram illustrating a transmission sequence by a broadcasting center in the online karaoke system practiced as a second preferred embodiment of the invention.

Therefore, in the second preferred embodiment, the center station 1 or broadcasting center 6 sends the same karaoke data at high and low transmission rates. FIG. 7 shows a transmission sequence of the broadcasting center 6. This transmission is executed according to PES (Packetized Elementary Stream) structure, the transport layer of MPEG-2 (Moving Picture Experts Group 2), in which the transmission is all executed in packet form. As shown in the figure, in addition to packet P1 of TV program data of satellite broadcasting and packet P2 of TV program information data, the broadcasting center 6 sends packet P3 of the first karaoke data and packet P4 of the second karaoke data.

The first karaoke data and the second karaoke data are substantially the same in contents. The packet P3 of the first karaoke data is sent at a higher transmission rate and a shorter interval, while the packet 4 of the second karaoke data is sent at a lower transmission rate and a longer interval. The packet P3 of the first karaoke data is selected and accumulated into the database by those karaoke terminals 3 or sub host stations 4 which are high in the capabilities of writing karaoke data to the RAM 23 and transferring the same to the hard disk 27*a* and have a sufficient RAM 23 capacity. Those karaoke terminals 3 or the sub host stations 4 which have low receiving capabilities select the packet P4 of the second karaoke data and accumulates the data associated with this packet into the database.

Figure 8:
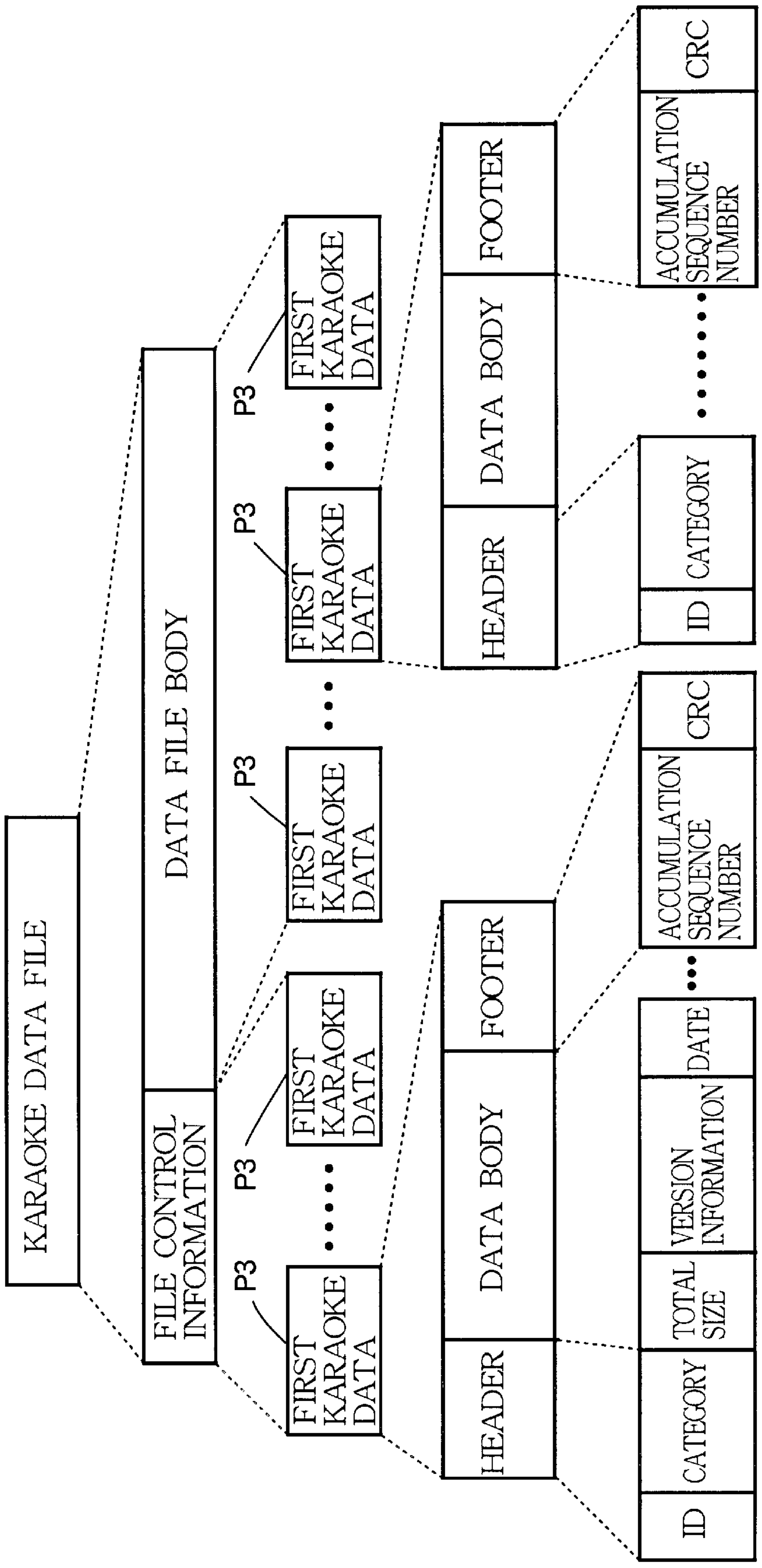
FIG. 8 is a diagram illustrating structure of karaoke data transmitted from the broadcasting center of the second preferred embodiment.

FIG. 8 shows a structure of the first karaoke data. The structure of the second karaoke data is substantially the same as the structure of the first karaoke data except for the transmission rate. As shown in the figure, a file of the first karaoke data is divided into file control information and a data file body. Each of the file control information and the data file body is divided into plural blocks or packets P3, which are sent from the broadcasting center 6. Each packet P3 is composed of a header, a data body, and a footer, amounting to a total size of 188 bytes.

The header of each packet P3 contains ID information indicative of packet type to show that this packet is the packet P3 of the first karaoke data, and category information indicative of the category of the data body including file control information, song data, video data, effect data, and so on. The footer contains the accumulation sequence number described before and a CRC (Cyclic Redundancy Code). The ID information in the header of the packet P4 of the second karaoke data indicates that this packet is the packet P4 of the second karaoke data. The data body of the packet P3 assigned to carry the file control information contains a size of the entire file, version information, and control information indicative of data file creation date. On the other hand, the data body of the packet P3 assigned to carry the data file body contains song data, fabrication data, or effect data.

Each karaoke terminal 3 or each sub host station 4 that receives karaoke data is tuned beforehand according to its capabilities such that either of the first karaoke data or the second karaoke data is selectively accumulated in the hard disk 27*a*. At the karaoke data reception, the karaoke terminal 3 or the sub host station 4 references the above-mentioned ID information indicative of the packet type, and transfers a received packet to the hard disk 27*a* for accumulation if the received packet is of the karaoke data designated for accumulation; if not, the received packet is not transferred to the hard disk 27*a*.

Thus, each karaoke terminal 3 or each sub host station 4 selects one of the transmission rates that is suitable for its storage capacity and processing capabilities, and accumulates the karaoke data at the selected transmission rate. Consequently, those karaoke terminals 3 or the sub host stations 4 which have only small storage capacities and low processing capabilities can surely prevent a dropout of packets in the karaoke data accumulation. On the other hand, those karaoke terminals 3 or the sub host stations 4 which have large storage capacities and high processing capabilities can complete the reception of karaoke data in a short time, thereby saving the power consumption and protracting the service lives of components such as the motor M of the hard disk drive 27.

The operation of the broadcasting center 6 of the second embodiment is generally the same as that shown in FIG. 4. The operation of the karaoke terminal 3 or the sub host station 4 of the second embodiment is generally the same as that shown in FIG. 5 except for a step in which the karaoke terminal 3 or the sub host station 4 compares the ID information with own setting at the time of receiving data from the communication satellite 2. Like the first embodiment, the second embodiment identifies the accumulation sequence number and drives the motor M of the hard disk drive 27 only when necessary, thereby saving the power consumption of the karaoke terminal 3 or the sub host station 4 and protracting the service lives of components such as the motor M.

The changes that can be made to the first embodiment can also be made to the second embodiment. In the second embodiment, the distribution of karaoke data is carried out in a broadcasting manner by the broadcasting center 6 to which the karaoke data is supplied from the center station 1. Alternatively, the center station 1 may carry out this distribution by itself. Further, in the second embodiment, the substantially same karaoke data is distributed in the same time zone at different transmission rates by different data streams. Alternatively, the first karaoke data may be distributed in the daytime while the second karaoke data may be distributed in the nighttime.

3. Third preferred embodiment

The following describes an online karaoke system practiced as a third preferred embodiment of the invention. The constitution of the third embodiment is generally the same as that of the first embodiment; namely, the karaoke data is distributed by use of a broadcasting network and a two-way communication network. In the third embodiment, however, the center station 1 or the broadcasting center 6 not only distributes the karaoke data of many songs routinely at a scheduled time but also distributes the karaoke data upon request from the karaoke terminal 3 or the karaoke terminal 5.

In the third embodiment, when the operator selects a song on the operator panel 28 of the karaoke terminal 3 or 5, the karaoke terminal 3 or corresponding sub host station 4 always requests the center station 1 through the public network N for sending the karaoke data. According to this request, the center station 1 or the broadcasting station 6 executes the karaoke data transmission.

The structure of karaoke data in the third embodiment is generally the same as that shown in FIG. 8. In the packet P assigned to the file control information located at the beginning of a karaoke data file, the data body contains a size of the entire file, version information, and control information indicative of data file creation date and so on. The requesting karaoke terminal 3 or the sub host station 4 references the version information and compares the version of the newly distributed karaoke data with the version of the old karaoke data already accumulated in the hard disk 27*a*. Only if the version of the karaoke data distributed this time is found newer than the version of the accumulated karaoke data, the karaoke terminal 3 or the sub host station 4 drives the motor M of the hard disk drive 27 to accumulate the received karaoke data into the hard disk 27*a*. Subsequently, the CPU 21 loads the selected karaoke data into the RAM 23 to reproduce the song.

In the third embodiment, the version information is examined and the motor M of the hard disk drive is driven only when necessary, thereby saving the power consumption of the karaoke terminal 3 or the sub host station 4 and protracting the service lives of components such as the motor M.

Instead of determining, by the version information, whether or not to accumulate the received karaoke data, the karaoke terminal 3 or the sub host station 4 may reference the data file creation date. Alternatively, the karaoke terminal 3 or the sub host station 4 may compare the karaoke data received this time with the karaoke data associated with the same song accumulated in the hard disk 27*a*. Only if the creation date of the received karaoke data is found later than the creation date of the accumulated karaoke data, the karaoke terminal 3 or the sub host station 4 may accumulate the received data in the hard disk 27*a*. Alternatively, the karaoke terminal 3 or the sub host station 4 may reference the size of the entire file. Only if the size of the file received this time is found larger than the size of the accumulated file, the karaoke terminal 3 or the sub host station 4 may accumulate the received karaoke data in the hard disk 27*a*.

Lastly, referring back to FIGS. 1 and 2, the invention covers a machine readable medium 26*a* such as floppy disk for use in the communication system having the CPU 11 or 21 for distributing karaoke data blocks having identification codes from the transmitting apparatus 1 through the broadcast network to the plurality of the receiving apparatuses 3 each having the storage device 27 that stores the karaoke data blocks after each of the karaoke data blocks is temporarily memorized in the buffer memory 23. The medium 26*a* contains program instructions loaded by a disk drive 26 and executable by the CPUs 11 and 21 to cause the communication system to perform the method comprising the steps of broadcasting the karaoke data blocks with the identification codes to the broadcast network from the transmitting apparatus 1, receiving the karaoke data blocks with the identification codes by the receiving apparatus 3 from the transmitting apparatus 1 through the broadcast network, temporarily memorizing each of the karaoke data blocks received by the receiver apparatus 3 in the buffer memory 23, discriminating the karaoke data blocks while each of the karaoke data blocks stays in the buffer memory 23 according to the identification codes attached to the karaoke data blocks for judging as to whether each of the karaoke data blocks should be transferred from the buffer memory 23 to the storage device 27, and driving the storage device 27 to store the karaoke data block when it is judged that the karaoke data block should be transferred to the storage device 27.

As described and according to the invention, the online karaoke system described above can prevent the dropout in karaoke data accumulation at each karaoke terminal and each sub host station. In addition, the online karaoke system according to the invention saves the power consumption at each karaoke terminal and each sub host station, and protracts service lives of components.

While the preferred embodiments of the present invention have been described using specific terms, such description is for illustrative purposes only, and it is to be understood that changes and variations may be made without departing from the spirit or scope of the appended claims.

What is claimed is:

1. An online karaoke system comprising a transmitting apparatus and a plurality of receiving apparatuses for distributing karaoke data blocks having identification codes from the transmitting apparatus to the plurality of the receiving apparatuses through a broadcast network, wherein the transmitting apparatus comprises broadcasting means for broadcasting the karaoke data blocks with the identification codes to the broadcast network, and wherein the receiving apparatus comprises receiving means for receiving the karaoke data blocks broadcast by the transmitting apparatus through the broadcast network, temporary memory means for temporarily memorizing the karaoke data blocks received by the receiving means, storage means for storing the karaoke data blocks after being temporarily memorized in the temporary memory means, discriminating means for discriminating the karaoke data blocks while staying in the temporary memory means according to the identification codes attached to the karaoke data blocks, judging means operative based on results of discriminating the karaoke data blocks for judging as to whether each of the karaoke data blocks should be transferred from the temporary memory means to the storage means, and drive means operative when the judging means judges that the karaoke data block should be transferred for driving the storage means to store the karaoke data block.

2. The online karaoke system according to claim 1, wherein the receiving apparatus is changeable between a drive mode with more energy consumption where the storage means is able to store the karaoke data blocks and a sleep mode with less energy consumption where the storage means is unable to store the karaoke data blocks, and wherein the receiving apparatus can change from the sleep mode to the drive mode when the judging means judges that the karaoke data block should be transferred from the temporary memory means to the storage means.

3. The online karaoke system according to claim 1, wherein the broadcasting means of the transmitting apparatus broadcasts the same karaoke data blocks at different rates, and wherein the receiving means of the receiving apparatus can receive the karaoke data blocks selectively at one of the different rates.

4. The online karaoke system according to claim 1, wherein the broadcasting means of the transmitting apparatus repeatedly broadcasts the same karaoke data blocks at cycles.

5. An online karaoke system comprising a transmitting apparatus and a plurality of receiving apparatuses for distributing karaoke data from the transmitting apparatus to the plurality of the receiving apparatuses through a broadcast network, wherein the transmitting apparatus comprises broadcasting means for broadcasting the same karaoke data to the broadcast network at different data transfer rates, and wherein the receiving apparatus comprises selecting means for selecting one of the different data transfer rates, receiving means for receiving the karaoke data at the selected data transfer rate from the transmitting apparatus through the broadcast network, temporary memory means for temporarily memorizing the karaoke data received by the receiving means, and storage means for storing the karaoke data after being temporarily memorized in the temporary memory means.

6. A communication system comprising a transmitting apparatus and a plurality of receiving apparatuses for distributing karaoke data blocks having identification codes from the transmitting apparatus to the plurality of the receiving apparatuses through a broadcast network, wherein the transmitting apparatus comprises a transmitter that broadcasts the karaoke data blocks with the identification codes to the broadcast network, and wherein the receiving apparatus comprises a receiver that receives the karaoke data blocks with the identification codes from the transmitting apparatus through the broadcast network, a buffer memory that temporarily memorizes each of the karaoke data blocks received by the receiver, a storage device that stores the karaoke data blocks after each of the karaoke data blocks is temporarily memorized in the buffer memory, and a controller that discriminates the karaoke data blocks while each of the karaoke data blocks stays in the buffer memory according to the identification codes attached to the karaoke data blocks for judging as to whether each of the karaoke data blocks should be transferred from the buffer memory to the storage device, the controller further being operative when judging that the karaoke data block should be transferred for driving the storage device to store the karaoke data block.

7. The communication system according to claim 6, wherein the receiving apparatus is changeable between an active state with more energy consumption such that the storage device is able to store the karaoke data blocks and an inactive state with less energy consumption such that the storage device is unable to store the karaoke data blocks, and wherein the receiving apparatus can restore from the inactive state to the active state when the controller judges that the karaoke data block should be transferred from the buffer memory to the storage device.

8. The communication system according to claim 6, wherein the transmitter broadcasts a set of the karaoke data blocks in a stream such that each of the karaoke data blocks is sequentially transmitted with the identification code that identifies an order of each karaoke data block in the stream, and wherein the receiver sequentially receives the karaoke data blocks transmitted in the stream and the controller operates according to the identification codes to keep the order of the karaoke data blocks during the course of storing the karaoke data blocks into the storage device.

9. The communication system according to claim 8, wherein the transmitter repeatedly broadcasts a set of the same karaoke data blocks, and wherein the controller operates when the order of the karaoke data blocks is disturbed during the course of storing the karaoke data blocks for controlling the storage device to stop the storing and then to restart the storing when a next set of the same karaoke data blocks is received.

10. The communication system according to claim 8, wherein the transmitter broadcasts the same set of the karaoke data blocks separately in a fast stream and in a slow stream, and wherein the receiver selects the fast stream to receive the karaoke data blocks when the receiving apparatus works fast and otherwise selects the slow stream to receive the karaoke data blocks when the receiving apparatus works slow.

11. A karaoke apparatus for providing a karaoke service according to karaoke data blocks distributed through a broadcast network from a host apparatus that broadcasts the karaoke data blocks with identification codes to the broadcast network, the karaoke apparatus comprising:

a receiver that receives the karaoke data blocks with the identification codes from the host apparatus through the broadcast network; a buffer memory that temporarily memorizes each of the karaoke data blocks received by the receiver;

a storage device that stores the karaoke data blocks after each of the karaoke data blocks is temporarily memorized in the buffer memory; and a controller that discriminates the karaoke data blocks while each of the karaoke data blocks stays in the buffer memory according to the identification codes attached to the karaoke data blocks for judging as to whether each of the karaoke data blocks should be transferred from the buffer memory to the storage device, the controller further being operative when judging that the karaoke data block should be transferred for driving the storage device to store the karaoke data block.

12. The karaoke apparatus according to claim 11, wherein the storage device is changeable between an active state with more energy consumption such that the storage device is able to store the karaoke data blocks, and an inactive state with less energy consumption such that the storage device is unable to store the karaoke data blocks, and wherein the controller controls the storage device to restore from the inactive state to the active state when the controller judges that the karaoke data block should be transferred from the buffer memory to the storage device.

13. A host apparatus for distributing karaoke data blocks to a plurality of karaoke apparatuses through a broadcast network, the host apparatus comprising:

a database that provides an update set of karaoke data blocks and arranges the karaoke data blocks in a stream to feed the karaoke apparatuses; and a transmitter that broadcasts the update set of the karaoke data blocks separately in a fast stream and in a slow stream so as to enable each of the karaoke apparatuses to select the fast stream to receive the karaoke data blocks when the karaoke apparatus works fast, and to otherwise select the slow stream to receive the karaoke data blocks when the karaoke apparatus works slow.

14. A method of distributing karaoke data blocks having identification codes from a transmitting apparatus through a broadcast network to a plurality of receiving apparatuses having a storage device that stores the karaoke data blocks after each of the karaoke data blocks is temporarily memorized in a buffer memory, the method comprising the steps of:

broadcasting the karaoke data blocks with the identification codes to the broadcast network from the transmitting apparatus;

receiving the karaoke data blocks with the identification codes by the receiving apparatus from the transmitting apparatus through the broadcast network;

temporarily memorizing each of the karaoke data blocks received by the receiver apparatus in the buffer memory;

discriminating the karaoke data blocks while each of the karaoke data blocks stays in the buffer memory according to the identification codes attached to the karaoke data blocks for judging as to whether each of the karaoke data blocks should be transferred from the buffer memory to the storage device; and driving the storage device to store the karaoke data block when it is judged that the karaoke data block should be transferred to the storage device.

15. A machine readable medium for use in a communication system having a CPU for distributing karaoke data blocks having identification codes from a transmitting apparatus through a broadcast network to a plurality of receiving apparatuses each having a storage device that stores the karaoke data blocks after each of the karaoke data blocks is temporarily memorized in a buffer memory, the medium containing program instructions executable by the CPU to cause the communication system to perform the method comprising the steps of:

broadcasting the karaoke data blocks with the identification codes to the broadcast network from the transmitting apparatus;

receiving the karaoke data blocks with the identification codes by the receiving apparatus from the transmitting apparatus through the broadcast network;

temporarily memorizing each of the karaoke data blocks received by the receiver apparatus in the buffer memory;

discriminating the karaoke data blocks while each of the karaoke data blocks stays in the buffer memory according to the identification codes attached to the karaoke data blocks for judging as to whether each of the karaoke data blocks should be transferred from the buffer memory to the storage device; and driving the storage device to store the karaoke data block when it is judged that the karaoke data block should be transferred to the storage device.

* * * * *